(12) United States Patent
Clark et al.

(10) Patent No.: US 12,512,218 B2
(45) Date of Patent: Dec. 30, 2025

(54) SPIROMETRY DATA SYSTEMS, METHODS, AND APPARATUSES

(71) Applicant: PulManage, Inc., Chapin, SC (US)

(72) Inventors: Amanda Clark, Lexington, SC (US); Prashant Duhoon, Columbia, SC (US); Ben Schooley, Lexington, SC (US); Neset Hikmet, Columbia, SC (US); Jay Dixon, Chapin, SC (US)

(73) Assignee: PULMANAGE, INC., Chapin, SC (US)

( * ) Notice: Subject to any disclaimer, the term of this patent is extended or adjusted under 35 U.S.C. 154(b) by 35 days.

(21) Appl. No.: 17/694,072

(22) Filed: Mar. 14, 2022

(65) Prior Publication Data

US 2022/0293264 A1 Sep. 15, 2022

Related U.S. Application Data

(60) Provisional application No. 63/164,040, filed on Mar. 22, 2021, provisional application No. 63/160,065, filed on Mar. 12, 2021, provisional application No. 63/160,060, filed on Mar. 12, 2021.

(51) Int. Cl.
*G16H 40/67* (2018.01)
*G06F 21/62* (2013.01)
*G16H 10/60* (2018.01)
*G16H 50/30* (2018.01)

(52) U.S. Cl.
CPC ......... *G16H 40/67* (2018.01); *G06F 21/6245* (2013.01); *G16H 10/60* (2018.01); *G16H 50/30* (2018.01)

(58) Field of Classification Search
CPC ........ G16H 40/67; G16H 10/60; G16H 50/30; G06F 21/6245
See application file for complete search history.

(56) References Cited

U.S. PATENT DOCUMENTS 7,831,246 B1 * 11/2010 Smith ................ G06Q 20/3255
455/420
11,425,002 B1 * 8/2022 Miocevic ............ G06F 9/44542
(Continued)

*Primary Examiner* — Michael Won
(74) *Attorney, Agent, or Firm* — BURR & FORMAN

(57) ABSTRACT

A healthcare monitoring and diagnostic data system may include a spirometry device configured to capture patient measurements of spirometry-based lung function as spirometry data for a patient, a mobile communications device configured to implement a pulmonary health application that establishes a first communications link with the spirometry device and receives the spirometry data from the spirometry device via the first communications link, and a cloud service configured to establish a second communications link with the mobile communications device to provide access to a plurality of serverless functionality endpoints. The cloud service may include a serverless backend that processes the spirometry data to determine if a threshold change in pulmonary health has occurred, provides a healthcare notification in response to determining that greater than the threshold change in pulmonary health for the patient has occurred, and stores the spirometry data within the serverless spirometry database in association with a patient account.

19 Claims, 8 Drawing Sheets

(56) References Cited

U.S. PATENT DOCUMENTS

| | | | | |
|---|---|---|---|---|
| 2003/0113831 A1* | 6/2003 | Hakonarson | ....... | G01N 33/5047 |
| | | | | 435/29 |
| 2005/0201540 A1* | 9/2005 | Rampey | ................ | H04M 15/06 |
| | | | | 379/142.14 |
| 2008/0275349 A1* | 11/2008 | Halperin | ................ | A61B 5/447 |
| | | | | 600/364 |
| 2011/0184250 A1* | 7/2011 | Schmidt | ................ | G16Z 99/00 |
| | | | | 600/300 |
| 2015/0347689 A1* | 12/2015 | Neagle | ................ | A61B 5/0836 |
| | | | | 705/3 |
| 2015/0363566 A1* | 12/2015 | Johnson | ................ | G16H 20/40 |
| | | | | 705/3 |
| 2016/0367186 A1* | 12/2016 | Freeman | .............. | A61B 5/7282 |
| 2017/0007126 A1* | 1/2017 | Shahar | ................ | A61B 5/0002 |
| 2017/0172519 A1* | 6/2017 | Stergiou | ................ | G16H 50/20 |
| 2018/0153440 A1* | 6/2018 | Lee | .................... | A61M 16/0066 |
| 2018/0280646 A1* | 10/2018 | Freeman | ................ | A61M 16/024 |
| 2020/0135334 A1* | 4/2020 | Rajasekhar | ............ | G10L 15/26 |
| 2020/0253547 A1* | 8/2020 | Harris | .................. | A61B 5/0022 |
| 2020/0383647 A1* | 12/2020 | Freeman | .............. | A61B 5/7264 |
| 2022/0003785 A1* | 1/2022 | Masters | ................ | G16H 50/30 |
| 2022/0233119 A1* | 7/2022 | Shelton, IV | ..... | A61B 17/07207 |
| 2022/0293264 A1* | 9/2022 | Clark | ................ | G16H 40/67 |
| 2023/0082966 A1* | 3/2023 | Burnett | ................ | G16H 50/30 |
| | | | | 600/484 |
| 2023/0380792 A1* | 11/2023 | Stamatopoulos | ...... | A61B 5/087 |

* cited by examiner

FIG. 4A

SPIROMETRY DATA SYSTEMS, METHODS, AND APPARATUSES

CROSS-REFERENCE TO RELATED APPLICATIONS

This application claims the benefit of U.S. Provisional Application No. 63/160,060 filed on Mar. 12, 2021; U.S. Provisional Application No. 63/160,065 filed on Mar. 12, 2021; and U.S. Provisional Application No. 63/164,040 filed on Mar. 22, 2021, the entire contents of each are hereby incorporated herein by reference.

TECHNICAL FIELD

Example embodiments generally relate to health care monitoring and data communications systems, and in particular monitoring and data communication systems involving the capture, distribution, and analysis of spirometry data.

BACKGROUND

As the Internet of Things continues to become a true reality, more and more devices, with a variety of uses, are being interconnected to share information and perform new tasks. Such change has been increasingly seen in the healthcare industry, where monitoring and diagnostic devices have been developed with communications capabilities to facilitate a variety of health-care related functionalities. However, because healthcare issues are often multi-dimensional, requiring a variety of information being required to make an accurate diagnosis, there continues to be a need for further connectivity to gather health-related data for different sources.

Additionally, once gathered, the storage and analysis of the data must also be considered. In this regard, the massive amounts of data that can be compiled can only be helpful if effective data processing and analysis techniques are developed to leverage the data. As such, there continues to be a need to both collect, through connectivity, health-related data and find ways to leverage that data to assist with diagnostics.

BRIEF SUMMARY OF SOME EXAMPLES

According to some example embodiments, a healthcare monitoring and diagnostic data system is provided that comprises a spirometry device configured to capture patient measurements of spirometry-based lung function as spirometry data for a patient, a mobile communications device configured to implement a pulmonary health application that establishes a first communications link with the spirometry device and receives the spirometry data from the spirometry device via the first communications link, and a cloud service configured to establish a second communications link with the mobile communications device to provide access to a plurality of serverless functionality endpoints. The plurality of functionality endpoints may include a pulmonary information exchange endpoint that receives the spirometry data. The cloud service may further comprise a serverless backend that processes the spirometry data with historical spirometry data to determine if a threshold change in pulmonary health of the patient has occurred. The historical spirometry data may have been previously stored in a serverless spirometry database. The serverless backend may also provide a healthcare notification in response to determining that greater than the threshold change in pulmonary health for the patient has occurred, and store the spirometry data within the serverless spirometry database in association with a patient account.

According to some example embodiments, a method for healthcare monitoring is provided. The method may comprise capturing, via a remote spirometry device, patient measurements of spirometry-based lung function as spirometry data for a patient, and implementing a pulmonary health application on a mobile communications device that establishes a first communications link with the spirometry device and receives the spirometry data from the spirometry device via the first communications link. Additionally, the method may also comprise establishing a second communications link between the mobile communications device and a cloud service to provide access to a plurality of serverless functionality endpoints of the cloud service including a pulmonary information exchange endpoint that receives the spirometry data, and processing, by a serverless backend of the cloud service, the spirometry data with historical spirometry data to determine if a threshold change in pulmonary health of the patient has occurred. The historical spirometry data may have been previously stored in a serverless spirometry database. The method may further comprise providing a health-based notification in response to determining that greater than the threshold change in pulmonary health for the patient has occurred, and storing the spirometry data within the serverless spirometry database in association with a patient account.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIGS. 4A and 4B illustrates an example data presentation screen and an associated legend according to some example embodiments;

DETAILED DESCRIPTION

Figure 1:
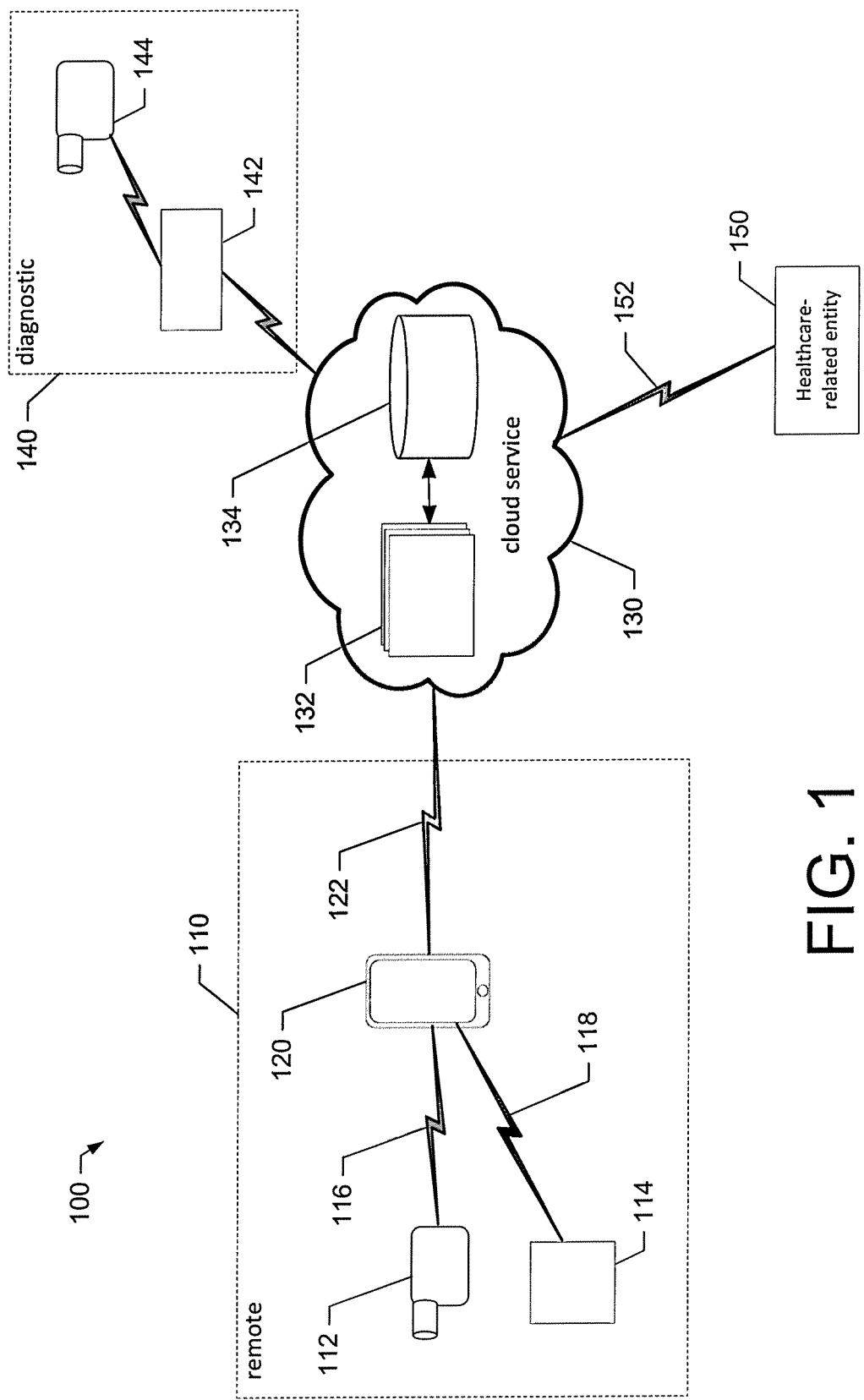
FIG. 1 illustrates an example healthcare monitoring and diagnostic data system according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

In view of the foregoing, some example embodiments are directed to a system for receiving and processing healthcare data that includes, more specifically, spirometry data. Spirometry data may be captured by a spirometry device that takes measurements of an airflow rate and duration from the lungs as a patient forcefully exhales. Spirometry devices can be utilized to provide critical pulmonary measurements for patients to enable early detection and intervention for deteriorating cases of a patient's lung function. The information captured during a spirometry session can be parsed and derived into a number of different characteristic values that can be considered in an analysis of pulmonary health. Table 1 below provides some example characteristic values that may be generated based on the spirometry data.

TABLE 1

| Value | Description |
|---|---|
| $FEV_t$ | Forced expiratory volume with respect to time indicating the volume air exhaled under forced conditions for the first t seconds |
| $FEV_1$ | Forced expiratory volume with respect to time indicating the volume air exhaled under forced conditions for the first second |
| $FEV_6$ | Forced expiratory volume with respect to time indicating the volume air exhaled under forced conditions for the first six seconds |
| $FEV_{10}$ | Forced expiratory volume with respect to time indicating the volume air exhaled under forced conditions for the first ten seconds |
| $FEF_x$ | Forced expiratory flow related to a portion of the force vital capacity (FVC) curve with x being indicative of an amount of FVC already exhaled |
| $FEF_{max}$ | Maximum instantaneous flow |
| VC | Vital capacity which is the volume of air breathed out after a deepest inhalation |
| FVC | Forced vital capacity is the total amount of air exhaled during a maximal forced exhalation |
| RV | Residual volume which is the volume of air remaining in the lungs after a maximal exhalation |
| TLC | Total lung capacity with may be VC + RV |

By no means is this an exhaustive list of spirometry-based characteristics. Rather, Table 1 only provides some examples of characteristics that may be derived from spirometry data and used in a spirometry-based diagnosis, such as a chronic obstructive pulmonary disease (COPD) diagnosis. However, while a vast amount of diagnostic information may be extracted from the spirometry data, the ability to capture and leverage this information, at more frequent intervals than a patient's office visits, has been a need in this area of pulmonary diagnostics. A remote spirometry device may be used more frequently by a patient and therefore changes in pulmonary health can be detected more readily with the use of such devices. According to some example embodiments, a remote spirometry device may be a personal or portable device for a patient that may be used, for example, in the home or elsewhere often not under the supervision of a healthcare professional. The remote spirometry device may capture spirometry data that can be coupled with other therapeutic data that may also be captured at the same time as the spirometry data and, in some example embodiments, may be self-reported via a pulmonary health application on a mobile communications device. As such, multiple dimensions of pulmonary health-related data can be captured and linked temporally to increase the diagnostic value of the data.

As such, according to some example embodiments, the system may be configured to capture and communicate spirometry data from, for example, remote and diagnostic spirometry devices. Such spirometry devices may include communications capabilities, and the spirometry devices may be configured to establish, for example, a wireless communication with a mobile communications device, such as a smart phone or the like. The mobile communications device may implement a pulmonary health application that operates to manage interactions with the spirometry device and a cloud service. In this regard, the mobile communications device may be configured to relay the spirometry data to a cloud service that may process and store the spirometry data, with other healthcare data, to assist in diagnostics and the detection of changes in pulmonary health. Additionally, the pulmonary health application on the mobile communications device may present the spirometry and other data for the patient to review, as well as, provide notifications to the patient based on the data collected (e.g., spirometry, therapeutic, or the like).

The cloud service, according to some example embodiments, may operate using a serverless architecture from the perspective of the pulmonary health application provider. In this regard, the cloud service may allocate and maintain the machine resources used to support the operation of the system, without the need for dedicated servers operated and maintained by the pulmonary health application provider. More specifically, in a serverless architecture the cloud service provider may address needs such as capacity planning, maintenance, fault tolerance, and scaling of containers, virtual machines, and physical servers. As such, the cloud service may provide a plurality of serverless functionality endpoints for interfacing with other entities within the system, such as the mobile communications device. The serverless functionality endpoints may include entities that support intra-application communications and coordination to perform functionalities such as authorization after authentication and enrolling patients, providers, and organizations.

According to some example embodiments, the cloud service may implement a serverless pulmonary information exchange endpoint and a serverless identity service provider endpoint as example serverless functionality endpoints. The serverless pulmonary information exchange endpoint may be configured to receive the spirometry data from the mobile communications device and provide the spirometry data to a serverless backend for processing as further described below. Based on the processing performed by the serverless backend, for example, healthcare notifications may be provided when a change in pulmonary health is determined based on the spirometry data. The serverless identity service provider endpoint may be configured to authenticate the patient and healthcare service providers to ensure that the healthcare data and any personally identifiable information are securely managed. According to some example embodiments, an account identifier may be used to map any personally identifiable information, stored in the serverless identity service provider endpoint, with the healthcare data stored in a serverless spirometry database by the serverless backend. As such, the account identifier may be used to avoid direct association between personally identifiable information and healthcare data. In this regard, because the spirometry data and other health care information may be protected under the Health Insurance Portability and Accountability Act (HIPAA), the pulmonary health application and the cloud service may be carefully designed to not only communicate and process the healthcare data, but also do so in a manner that protects the patient's privacy in compliance with HIPAA.

According to some example embodiments, the cloud service, and more specifically, the serverless backend may be configured to process and analyze the spirometry data to make diagnostic determinations and provide notifications regarding the same. Further, the serverless pulmonary information exchange endpoint may be configured to receive other health-related data in the form of therapeutic data from the pulmonary health application implemented by the mobile communications device. In this regard, for example, the pulmonary health application may receive therapeutic data, which may also be self-reported healthcare data, from other health monitoring devices or via manual entry by the patient. In either case, the therapeutic data may be received by the cloud service and the serverless backend may process and analyze the therapeutic data with the spirometry data to make or present diagnostic determinations and provide related notifications. The therapeutic data may comprise a number of different types of data including but not limited to indications of respiration rate (i.e., number of breaths per unit time) coughing, wheezing, difficulty breathing, sputum color, chills, aches, fatigue, fever, skin conditions, or the like. These therapeutic factors may be considered in combination with characteristics of the spirometry data for diagnostic purposes. In this regard, thresholds for different spirometry data characteristics in combination with thresholds for some of the therapeutic data may be considered to determine when an alert or healthcare notification should be provided to the patient, healthcare provider, or healthcare coverage provider.

Having described some aspects of example embodiments, reference will now be made to FIG. 1, which illustrates an example healthcare monitoring and diagnostic data system 100. The system 100 may be configured to, among other things, support remote patient monitoring (RPM). The system 100 may be comprised of remote components 110, diagnostic components 140, a cloud service 130, and a healthcare-related entity 150. These groups of components may be configured to operate within the system 100 to provide monitoring and diagnostic functionalities.

According to some example embodiments, the remote components 110 (e.g., patient-operated components) may include a spirometry device 112, a supplemental healthcare device 114, and a mobile communications device 120. The spirometry device 112 may be a healthcare device that makes readings of airflow rate and duration from the lungs as a patient forcefully exhales during a spirometry session. Further, the spirometry device 112 may be provided to the patient by a healthcare provider to permit the patient to take regular remote measurements for analysis.

The spirometry device 112 may include control circuitry (e.g., a processor, field programmable logic array (FPGA), application specific integrated circuit (ASIC), or the like) to control the operation of the spirometry device 112. In this regard, the control circuitry may be configured to conduct a spirometry session with the patient to collect spirometry data. A session, according to some example embodiments, may include three or more forced exhales during which measurements of the exhale force over time may be captured as spirometry data without hesitation or flow interruption. Because patients can have a difficulty providing a proper forced exhale, the spirometry device 112 can require three or more attempts in an effort to capture reliable data. Variability in the data from one attempt to another may be indicative of a failed attempt (e.g., due to coughing or the like), and therefore the spirometry device 112 may require further attempts in an effort to ensure that the captured data is reliable. Once captured, the spirometry data may be stored in a memory of the spirometry device 112 temporarily.

The spirometry device 112 may also include a communications interface. In this regard, the communications interface may be a wireless interface configured to transmit and receive communications and data. The communications interface may be configured to communicate via a wireless communications protocol such as Bluetooth, WIFI, near-field communications (NFC), or the like. According to some example embodiments, the spirometry device 112 may implement such a wireless communication protocol and an accessible software development kit (SDK). As such, the spirometry device 112 may be configured to establish a communications connection or link 116 with another communications device, such as, for example, the mobile communications device 120. Such communications link 116 may support transmit and receive communications, which may be performed in a synchronous or asynchronous fashion.

The mobile communications device 120 may be any type of mobile device having communications capabilities. According to some example embodiments, the mobile communications device 120 may be a smart phone, a wearable device (e.g., watch, glasses, augmented reality headset, etc.), or the like. The mobile communications device 120 may also comprise a communications interface that is configured to establish the connection 116 with the spirometry device 112. The mobile communications device 120 may also comprise processing circuitry configured to control the operation of the mobile communications device 120. In this regard, the mobile communications device 120 may be configured to implement a pulmonary health application, which may be a software program that is executed by the processing circuitry configured to implement the pulmonary health application. The pulmonary health application may control the operation of the mobile communications device 120 to perform a variety of functionalities with respect to spirometry data that may be received by the pulmonary health application via the connection 116.

According to some example embodiments, the pulmonary health application may provide instructions to the patient for using the spirometry device 112. In this regard, the pulmonary health application may provide a series of prompts to the patient to conduct a spirometry session. According to some example embodiments, the pulmonary health application may cause the patient to perform three forced exhales. Once the spirometry data is received from the spirometry device 112, the pulmonary health application may analyze the spirometry data to determine if one or more of the forced exhales was insufficient for a minimum duration, due to coughing, and the like. If the pulmonary health application is able to detect that one or more of the forced exhales were insufficient, then the pulmonary health application may prompt the patient to perform another session of forced exhales. During each session, spirometry data may be captured. However, additional information may also be captured including, but not limited to, location information, date and time, a unique session number, a spirometry device identification number, a mobile communications device number, and a license number for the pulmonary health application. Additionally, in response to receiving a notification of declining health, the pulmonary health application may increase a frequency of prompting the patient to perform a spirometry measurement using the spirometry device to capture new spirometry data. Additionally, therapeutic information or data may also be captured. In this regard, data such as vital signs, weight, temperature, heart rate, respiration rate, or the like.

The supplemental healthcare device 114 may be configured to measure a health-related characteristic of the patient. The supplemental healthcare device 114 may be a heart rate monitor, a weight scale, a thermometer, a pulse oximeter, a continuous positive airway pressure (CPAP) device, bi-level positive pressure device, non-invasive ventilation device, or the like. As such, the supplemental healthcare device 114 may be configured to capture additional or other healthcare data in the form of heart rate data, weight data, temperature data, blood-oxygen content data, and airway pressure data. Like the spirometry device 112, the supplemental healthcare device 114 may be configured to take measurements and communicate those measurements as additional or other healthcare data for the patient. In this regard, the supplemental healthcare device 114 may be configured to establish a communications connection 118 with the mobile communications device 120 to communicate the other healthcare data.

In addition to connecting to the spirometry device 112 and the supplemental healthcare device 114, the mobile communications device 120 may, via the pulmonary health application, establish another communication link or connection 122 with the cloud service 130. The cloud service 130 may operate to handle, parse, and manage the spirometry data and other healthcare data using techniques including secure copy, secure file transfer, application programming interfaces (APIs), or the like. In this regard, some techniques utilize APIs to receive, process, store, and send data made available from the spirometry device 112.

The cloud service 130 may include a plurality of serverless functionality endpoints and processing entities 132 and a serverless spirometry database 134 that is accessible to the mobile communications device 120 via a network such as the Internet. The serverless spirometry database 134 may be organized to support the storage and access of, for example, longitudinal data. The cloud service 130 may be a subscription service that offers a collection of resources including processing and storage devices that are shared with various clients of the cloud service 130. According to some example embodiments, the cloud service 130 may implement a serverless computing approach. Serverless computing can involve the use of a cloud computing execution model where a cloud provider handles backend servers or services and issues relating to information technology infrastructure that are delegated to the cloud provider. The cloud provider may provide resources (e.g., computing, storage, etc.) with a set of API endpoints to deploy various services. The endpoints may be infinitely scalable, and costs may be calculated based on service utilization. Hence, in some instances, no costs may be accrued when there is no utilization of the resources. As such, a cost-effective solution for a web-enabled application and system can be realized. Additionally, serverless computing may have a relative rapid time-to-market for a given implementation and has demonstrated relatively high efficacy in a variety of application use cases. As such, cloud service 130 may provide secure, HIPAA compliant, scalable and highly reliable architecture for application development. Further, the serverless architecture may be secured by various layers of roles, network isolation, and firewalls to exercise a HIPAA compliant virtual private cloud deployed with the cloud service 130.

According to some example embodiments, the serverless functionality endpoints and processing entities 132 of the cloud service 130 may be specifically configured to support the operation of the healthcare monitoring and diagnostic data system 100. In this regard, as further described below, the cloud service 130 may comprise a pulmonary information exchange endpoint, a serverless backend, and a serverless identity service provider endpoint. In short, the serverless identity service provider endpoint may be configured to perform a patient authentication to control access to data and functionalities. In this regard, the serverless identity service provider endpoint may separately hold all personally identifiable information of the patient for verification when the patient accesses the cloud service 130. The pulmonary information exchange endpoint may operate as a communications front end for the cloud service 130 for receiving data for processing and transmitting data out that has been processed. The serverless backend may be configured to process the healthcare data and cause the data to be stored in a serverless spirometry database 134.

The serverless spirometry database 134 may reside in the cloud service 130 and many be the repository for spirometry data and other healthcare data that may be captured and stored within the system 100. According to some example embodiments, the serverless spirometry database 134 may be operated as an electronic medical record for the patient. The data may be stored, for example, in association with a patient account and in relational or non-relational databases with stringent HIPAA compliant security protocols. The serverless spirometry database 134 may be configured to store spirometry data for a patient for any number of spirometry sessions for a given duration of time. As such, the data stored in the serverless spirometry database 134 may be used to provide longitudinal patient specific data and data representations (e.g., charts, graphs, etc.). In some example embodiments, the data may be stored in association with an account identifier that does not include personally identifiable information. The account identifier may be known to the serverless identity service provider endpoint and therefore, via a proper authentication, the data may be accessible due to a mapping between the personally identifiable information of the serverless identity service provider endpoint with the account identifier used by the serverless spirometry database 134.

As such, the cloud service 130 may be configured to receive spirometry data and other healthcare data for processing and storage in the serverless spirometry database 134. Additionally, the cloud service 130 may be configured to take actions with respect to the spirometry data and the other healthcare data. For example, as further described herein, the cloud service 130 may be configured to analyze the spirometry data and the other healthcare data to determine if changes in pulmonary health have occurred as further described herein.

With respect to the diagnostic components 140, a data interface 142 and a diagnostic spirometry device 144 may be included. The data interface 142 may be an office computer, server, or other device that operates to transfer spirometry data received from the spirometry device 144 to the cloud service 130. The diagnostic spirometry device 144 may be similar to the device 112, but may be a more sophisticated and robust spirometry device that is located and used in a healthcare office or facility under the supervision of a healthcare professional. Because the spirometry data captured by the diagnostic spirometry device 144 was captured under the supervision of healthcare personnel, the spirometry data from the diagnostic spirometry device 144 can be considered trustworthy. According to some example embodiments, trustworthy spirometry data may be reliable and reproducible due to the involvement of a healthcare profession and the use of a diagnostic spirometry device. Additionally, trustworthy spirometry data may be defined as diagnostic quality spirometry data that meets the American Thoracic Society (ATS) standards for acceptability and repeatability. The process of taking spirometry measurements involves effort by the patient to perform the forced exhalation technique properly. If the patient makes a poor effort, the captured data is erroneous and should not be relied upon for diagnostic assessments. When healthcare personnel are supervising the patient, the healthcare personnel can make an assessment as to whether the patient's effort during the spirometry session was sufficient (e.g., based on ATS criteria) for the data to be considered trustworthy. If a poor effort was made, then the healthcare personnel may discard the captured data and re-attempt the spirometry session to obtain trustworthy data. This is in contrast with a remote spirometry session, which does not necessarily result in trustworthy data because no healthcare personnel are present to ensure a proper effort by the patient. As such, the spirometry data that is captured by the spirometry device 144 may be more reliable than the spirometry data that is captured by the remote spirometry device 112. According to some example embodiments, the spirometry data may be coupled with an indicator (e.g., serial number, etc.) that indicates that the spirometry data was captured in a manner that permits the spirometry data to be deemed trustworthy as provided herein.

The healthcare-related entity 150 may be another entity that may have access to the cloud service 130 and more specifically to the data stored in the serverless spirometry database 134 of the cloud service 130. According to some example embodiments, the healthcare-related entity 150 may be an entity that the patient has approved to access to the data. In this regard, the healthcare-related entity 150 may comprise a computer, smartphone, tablet, or the like. In this regard, the healthcare-related entity 150 may be a healthcare provider or a health insurance provider. According to some example embodiments, the healthcare-related entity 150 may automatically receive new spirometry data and other health data when a patient uploads the data to the cloud service 130. In this regard, the healthcare-related entity 150 may subscribe to certain desired accounts or patients to receive notifications of new uploads or alerts for changes health conditions. The spirometry data and other health data may be received in the form of a report that may include highlighted or prominent portions indicating items of concern that may be indicative of a threshold change in pulmonary health. The healthcare-related entity 150 may be required to authenticate with the serverless identity service provider endpoint to gain access to the cloud service 130 and the serverless spirometry database 134 to obtain information relating to the patient. Once access is provided, the healthcare-related entity 150 may be able retrieve data for monitoring and presentation. In this manner, the healthcare providers may be able to remotely monitor patient health readings measured by the spirometry device 112.

Figure 2:
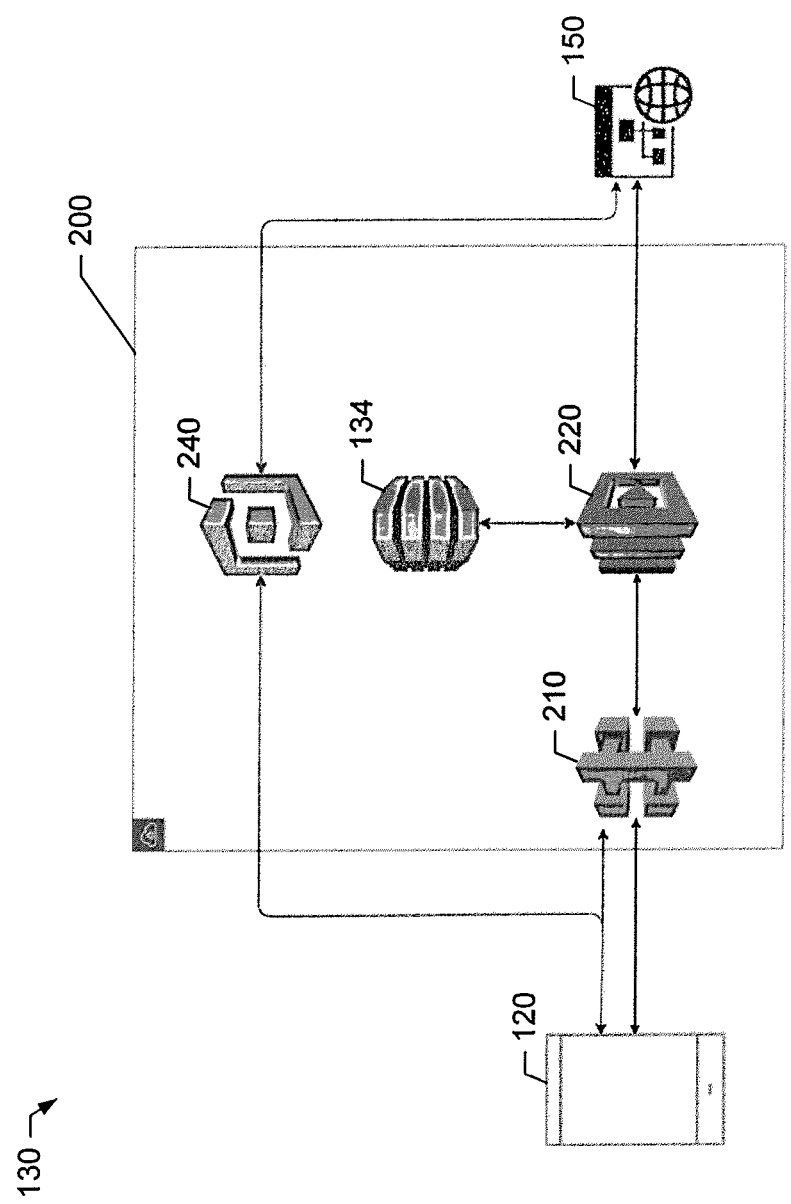
FIG. 2 illustrates an example cloud service and details regarding the internal architecture according to some example embodiments.

Having described an example system architecture and some associated functionalities of a healthcare monitoring and diagnostic data system, FIG. 2 will now be described which includes further detail regarding the internal architecture of the example cloud service 130. The cloud service 130 is shown in association with the mobile communications device 120 and the healthcare-related entity 150. As described above, the mobile communications device 120, implementing a pulmonary health application, may establish a communications connection with the cloud service 130. Additionally, the healthcare-related entity 150 may also establish a communications connection with the cloud service 130. The cloud service 130 may be enveloped in a HIPAA compliant environment 200 that operates as a virtual private cloud service for the system. Within the environment 200, the cloud service 130 may comprise a pulmonary information exchange endpoint 210, a serverless backend 220, the serverless spirometry database 134, and a serverless identity service provider endpoint 240.

As described above, the mobile communications device 120 implementing a pulmonary health application may receive spirometry data from a spirometry device for transmission to the cloud service 130. The mobile communications device 120 may then establish a communications connection with the cloud service 130 and, more particularly, the pulmonary information exchange endpoint 210. The pulmonary information exchange endpoint 210 may implement an API that supports the exchange of data between the pulmonary health application implemented by the mobile communications device 120 and the cloud service 130. The pulmonary health application may also allow for the self-entry of various therapeutic data, which may include logging information regarding vital signs, disease symptoms, diagnoses, treatments, and other medical data collected by healthcare professionals at the health care provider's medical office. According to some example embodiments, the pulmonary health application may automatically send the spirometry data and other health data to the cloud service 130 to permit other healthcare-related entities to gain access to the data in an efficient manner. Once the spirometry data and the other health data is delivered to the cloud service 130, the pulmonary health application may be configured to delete the spirometry data and the other health data from the mobile communications device 120.

However, prior to exchanging data, an authentication of the patient can be implemented with the serverless identity service provider endpoint 240. The serverless identity service provider endpoint 240 may operate to authenticate a patient for security purposes and also store personally identifiable information (e.g., name, date of birth, gender, etc.). In this regard, the pulmonary health application may receive authentication information from the patient such as, a password, biometric identification information, or the like. According to some example embodiments, the authentication information may include the spirometry device's serial number, which may be required for verification. Such authentication information may be first received by mobile communications device 120 and used to allow the patient access to the pulmonary health application. This same authentication information may be used to login to the cloud service 130. In this regard, the authentication information may be transmitted to the serverless identity service provider endpoint 240 for verification. If the authentication information is verified, the pulmonary health application may be notified and, according to some example embodiments, an authentication token may be provided to the pulmonary information exchange endpoint 210 indicating that access may be granted to the pulmonary health application on the mobile communications device 120. After authentication is complete, the pulmonary health application may be permitted to upload spirometry data and other health data to the cloud service 130 for provision to the serverless backend 220. Upon receipt, the serverless backend 220 may perform various parsing and other management of the received data for storage into the serverless spirometry database 134.

The serverless identity service provider endpoint 240 may store personally identifiable information (PII) for a patient.

The spirometry data in the serverless spirometry database 134 may be mapped to individual patient identities in the serverless identity service provider endpoint 240. According to some example embodiments, no PII is stored in serverless spirometry database 134, but PII may be stored with an account identifier for the patient's account in the serverless identity service provider endpoint 240. According to some example embodiments, the account identifier may be randomly generated to map the patients in the serverless identity service provider endpoint 240 and respective spirometry data in the serverless spirometry database 134. In this regard, a separate identity service may also be used to handle data for providers and healthcare organizations. The serverless identity service provider endpoint 240, as a separate identity service, may control spirometry and PII data visibility and availability for different levels of authorization.

According to some example embodiments, the serverless backend 220 may also be configured to address data inconsistencies generated from, for example, the control circuitry of a spirometry device and transmitted wirelessly by using the serverless backend 220. The serverless backend 220 may operate to extend the behavior of a serverless pulmonary information exchange endpoint 210 with the associated API by turning each request into a transaction.

Additionally, the healthcare-related entity 150 may perform an authentication with the serverless identity service provider endpoint 240 in a similar manner as the pulmonary health application. The healthcare-related entity 150, which may be operated as a provider administration portal, may operate to request and receive processed or parsed spirometry and other healthcare data from the serverless spirometry database 134. Such data may be provided in a manner that can be readily imported into systems and databases maintained by the healthcare-related entity 150 for diagnostic, coverage, or other purposes.

Figure 3A:
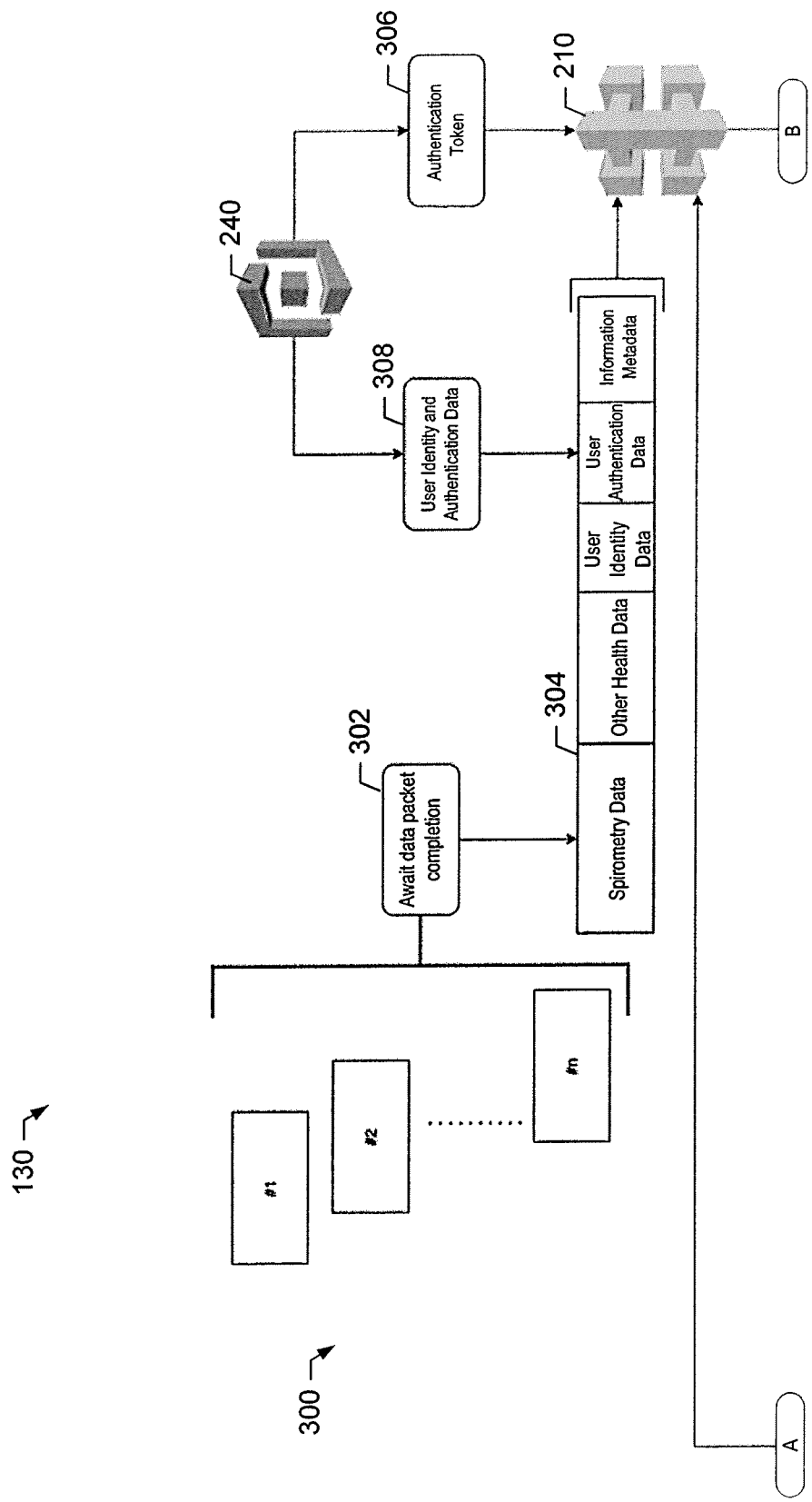
FIGS. 3A and 3B illustrate an example cloud service focusing on parsing aspects of spirometry data according to some example embodiments.
Figure 3B:
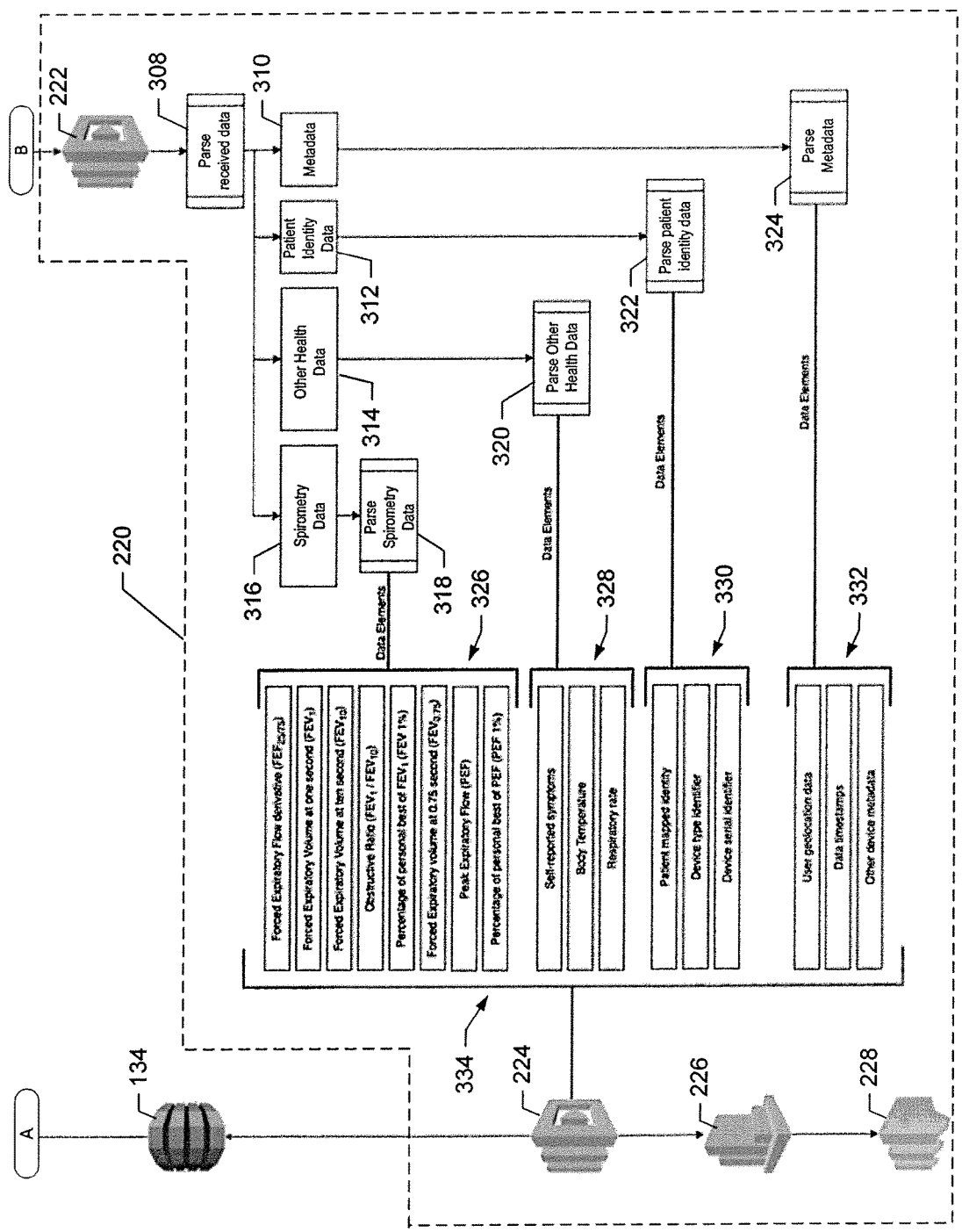

FIGS. 3A and 3B will now be described, which show additional aspects of the data parsing and storage performed by the serverless backend 220. FIGS. 3A and 3B are portions of one schematic diagram of the cloud service 130. In this regard, the cloud service 130, and more particularly, the pulmonary information exchange endpoint 210 may receive a plurality of data packets 300 (i.e., #1 to #n packets) from the mobile communications device 120. The pulmonary information exchange endpoint 210 may initially await receipt of the complete transmission or an indication that the final data packet is received at 302. The received data 304 may comprise various component data segments. In this regard, the received data 304 associated with received packets may include spirometry data, other health data (e.g., therapeutic data), and information metadata. In association with the transmission of the data packets, an authentication of the patient with the serverless identity service provider endpoint 240 may have previously taken place that resulted in the patient being authenticated. As a result, an authentication token 306 for the patient may be provided to the pulmonary information exchange endpoint 210 to permit the received data 304 to be received by the pulmonary information exchange endpoint 210 for further processing. Prior to passing the received data 304 forward for processing and in response to authentication of the patient, the serverless identity service provider endpoint 240 may determine user identity and authentication data at 308 and insert the user identity and authentication data into the received data 304. Once these insertions are made, the received data may be provided to the serverless backend 220, and more specifically the serverless parsing function 222.

As shown in FIG. 3B, the serverless backend 220 may be comprised of a number of processing entities including the serverless parsing function 222, serverless data resolver function 224, serverless error logger 226, and the serverless error notification and logger 228. As mentioned above, the serverless parsing function 222 may operate on the received data 304. In this regard, the serverless parsing function 222 may parse the received data 304 at 308. The received data 304 may be parsed into the spirometry data 316, the other health data 314, the patient identity data 312, and metadata 310. According to some example embodiments, the serverless parsing function 222 may further parse the spirometry data 316 at 318 into a number of different characteristic values of a spirometry dataset 326. In this regard, the spirometry dataset 326 may comprise forced expiratory flow derivative ($FEF_{25/75}$), forced expiratory volume at one second ($FEV_1$), forced expiratory volume at ten seconds ($FEV_{10}$), obstruction ratio ($FEV_1/FEV_{10}$), percentage of personal best of $FEV_1$ ($FEV_1\%$), forced expiratory volume at 0.75 seconds ($FEV_{0.75}$), peak expiratory flow (PEF), and percentage of personal best of PEF (PEF 1%). Additionally, according to some example embodiments FVC may also be determined via the parsing. However, in some instances where FVC data is unreliable or unavailable, $FEV_6$ or $FEV_{10}$ may be used as a surrogate for FVC. According to some example embodiments, a ratio $FVC/FEV_1$ may also be determined via parsing, which may be useful in determining a diagnosis of obstructive lung disease.

The serverless parsing function 222 may also parse the other health data 314 at 320. In this regard, the other health data 314 may be parsed into another health dataset 328. The other health dataset 328 may comprise a plurality of self-reported symptoms (as further described with respect to FIGS. 4A and 4B), body temperature, and respiration rate. Additionally, the serverless parsing function 222 may parse the patient identity data 312 into the patient identity dataset 330. The patient identity dataset 330 may include information, for example, about the spirometry device that was used to capture the spirometry data 316. In this regard, the patient identity dataset 330 may comprise a patient mapped identity, a device type identifier, and a device serial identifier. According to some example embodiments, the patient mapped identity may also be referred to as an account identifier that provides a means for mapping the received data with the personally identifiable information of the patient. The serverless parsing function 222 may also parse the metadata 310 at 324. In this regard, the metadata 310 may be parsed into metadata dataset 332. The metadata dataset 332 may comprise user geolocation data, data timestamps, and other device metadata.

According to some example embodiments, the spirometry dataset 326, other health dataset 328, patient identity dataset 330, and the metadata dataset 332 may be combined into an aggregated dataset 334 to be received by the serverless data resolver function 224. In this regard, the serverless data resolver function 224 may be configured to handle and aggregate the data. The data may be passed to serverless error logger 226, and the serverless error notification and logger 228. These entities may operate to identify errors in the data and log such errors in a stored log file. The serverless data resolver function 224 may also pass the aggregated dataset 334 to the serverless spirometry database 134 for storage. The serverless spirometry database 134 may also provide notification of the storage to pulmonary information exchange endpoint 210.

In addition to performing parsing operations, the serverless backend 220 may be configured to perform processing and notification operations, with respect to the spirometry data and the other health data stored in the serverless spirometry database 134. In this regard, the stored data (e.g., the spirometry data and the other health data) may include indicators of the patient's changing health over time that might not have been otherwise determined without a computerized analysis. Because the data is maintained and regularly supplemented with new spirometry data, diagnosis validation can be performed. Additionally, the data itself can also be validated based on the prior data and/or prior trustworthy data as described herein.

Additionally, according to some example embodiments, the serverless backend 220 may be configured to provide notifications, including healthcare notifications, based on the received spirometry data and other health data. In some instances, the provision of new and updated spirometry data and other healthcare data may cause the serverless backend 220 to trigger a new patient report or an associated notification to be provided to, for example, a healthcare provider (e.g., healthcare-related entity 150). According to some example embodiments, various thresholds may be utilized to determine when a sufficient health change has occurred to warrant the sending of a notification, for example, to the patient or the patient's healthcare provider.

Additionally, the serverless backend 220 may be configured to processes the spirometry data with historical spirometry data stored in the serverless spirometry database 134 to determine if a threshold change in pulmonary health of the patient has occurred. In this regard, the historical spirometry data may have been previously stored in the serverless spirometry database 134. Further, the serverless backend 220 may be configured to provide a healthcare notification in response to determining that greater than the threshold change in pulmonary health for the patient has occurred. The serverless backend 220 may provide the healthcare notification to the mobile communications device 120 and a healthcare provider (e.g., healthcare-related entity 150). The healthcare notification, according to some example embodiments, may take a number of different forms. For example, the serverless backend 220 may trigger a healthcare notification in the form of a prompt or series of prompts to the patient to take certain actions, such as precautionary measures including taking medicines. Additionally, or alternatively, the healthcare notification may include calling for immediate emergency services and providing a location based on a location provided by a location sensor of the mobile communications device 120. Additionally, or alternatively, the healthcare notification may include sending a message to a healthcare-related entity 150 to contact the patient for a consultation or send non-emergency medical services to the patient. Further, depending on a severity of the threshold change in pulmonary health, different and multiple healthcare notifications may be provided. As such, the type and quantity of healthcare notifications may be based on the degree to which data thresholds are exceeded or multiple thresholds may be defined, where each is associated with a particular healthcare notification response. Additionally, the serverless backend 220 may be configured to cause the spirometry data to be stored within the serverless spirometry database 134 in association with a patient account. Additionally, in some example embodiments, the historical spirometry data may comprise trustworthy spirometry data that was captured by a spirometry device while a patient was under supervision of healthcare personnel during measurements associated with the trustworthy spirometry data (e.g., measurements taken with the spirometry device 144). Accordingly, the serverless backend 220 may be configured to validate the recently captured spirometry data from the remote spirometry device 112 against the trustworthy spirometry data by determining if the spirometry data from the remote spirometry device is within a threshold range (e.g., within plus or minus ten percent) of the trustworthy spirometry data (e.g., an average of the trustworthy spirometry data). Additionally, according to some example embodiments, the serverless backend 220 may be configured to receive the trustworthy spirometry data and store the trustworthy spirometry with the spirometry data from the remote spirometry device 112 in association with the patient account.

Further, according to some example embodiments, the serverless backend may processes the spirometry data with therapeutic data to determine if the threshold change in pulmonary health has occurred. The therapeutic data, according to some example embodiments, may be self-reported by the patient into the pulmonary health application. The threshold change in pulmonary health may be defined by at least a threshold decrease in spirometry-based lung function as indicated by new spirometry data relative to a stable spirometry-based lung function for the patient over a recent duration of time (e.g., one month or since a last diagnosed pulmonary healthcare event) as indicated by historical spirometry data and at least a threshold increase (e.g., ten percent) in respiration rate for the patient over the recent duration of time. A spirometry-based lung function may be a characteristic of lung function that may be derived from the spirometry data (e.g., $FEV_1$, $FEV_6$, $FEV_{10}$, FVC, PEF, or the like). A stable spirometry-based lung function may be a lung function that may also be derived from the spirometry data, but is based on historical data that is not in decline and/or has a less than a threshold standard deviation. According to some example embodiments, the threshold change in pulmonary health may alternatively be defined by at least a threshold decrease in spirometry-based lung function relative to a stable spirometry-based lung function for the patient over a recent duration of time and a change in sputum characteristics over the recent duration of time (e.g., sputum became bloody).

According to some example embodiments, the serverless backend 220 may process the spirometry data to determine $FEV_x$ data (e.g., where x is a number of seconds). Again, the threshold change in pulmonary health, in this example embodiments, may be defined by at least a threshold decrease in $FEV_x$ data relative to stable $FEV_x$ data for the patient over a recent duration of time and at least a threshold increase in respiration rate for the patient over the recent duration of time. According to some example embodiments, a threshold change in pulmonary health may be determined based on a combination of factors including changes in characteristic of lung function measurements (e.g., $FEV_1$, $FEV_6$, $FEV_{10}$, FVC, PEF, or the like) and changes in therapeutic characteristic (e.g., respiration rate, coughing, wheezing, difficulty breathing, sputum color, chills, aches, fatigue, fever, skin conditions) that leads to a determination that threshold change in pulmonary health has occurred. Each factor may be associated with a respective list of normalized quantitative values that allow for comparison and other analyses between factors on a normalized basis. According to some example embodiments, some normalized factors may be weighted more heavily in the analysis (e.g., weighted by applying a multiplier). For example, changes in respiration rate may be weighted more heavily than changes in fatigue or $FEV_1$. According to some example embodiments, the weightings of some normalized factors, e.g., respiratory rate may be non-linear such that, for example, the weighting may increase at a more rapid rate as the respiration rate increases.

Additionally, in some example embodiments, factors may be substitutes or a surrogate may be used when data is unreliable or unavailable. For example, in some instances, the data associated with FVC may be unreliable or unavailable due to, for example, a patient's limited ability to perform a forced exhale procedure. In such instances, a surrogate value may be used in a pulmonary health analysis for the FVC. For example, $FEV_{10}$ or $FEV_6$ measurements may be used as a proxy for FVC.

Another data relationship that may be determined and considered with respect to a threshold change to pulmonary health may comprise the ratio of FVC to $FEV_1$. In this regard, possibly in consideration of other factors (e.g., respiration rate), if the ratio exceeds a threshold ratio or a threshold change in the ratio relative to a stable base ratio, a threshold change in pulmonary health may be determined by the cloud service 130 or more specifically the serverless backend 220. In response, an action can be taken such as a healthcare notification or the like.

Additionally, according to some example embodiments, the pulmonary health application implemented by the mobile communications device 120 may authenticate an identity of the patient with the serverless identity service provider endpoint 240. The serverless backend 220 may store the spirometry data within the serverless spirometry database 134 in association with the patient account using an account identifier. In some example embodiments, the account identifier and the serverless spirometry database do not include personally identifiable information about the patient. Further, the serverless identity service provider endpoint 240 may use the account identifier to map data within the serverless spirometry database with the personally identifiable information about the patient held by the serverless identity service provider endpoint 240. According to some example embodiments, the serverless backend 220 may establish a communication connection with a healthcare-related entity 150 in response to a healthcare provider performing an identity authentication with the serverless identity service provider endpoint 240. The serverless backend 220 may then provide the healthcare-related entity 150 with access to data from the serverless spirometry database 134 based on the identity authentication.

Figure 4A:
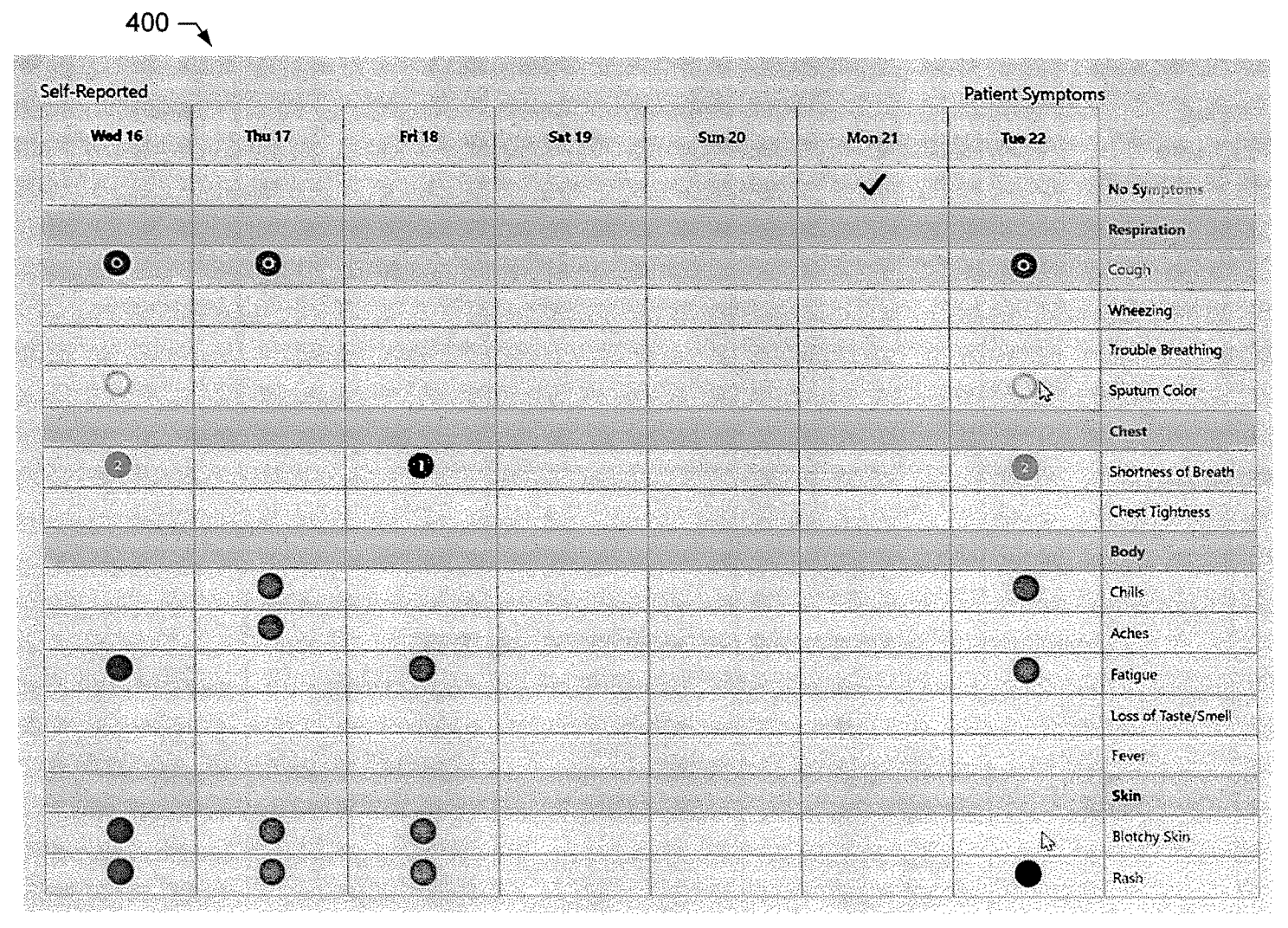
Figure 4B:
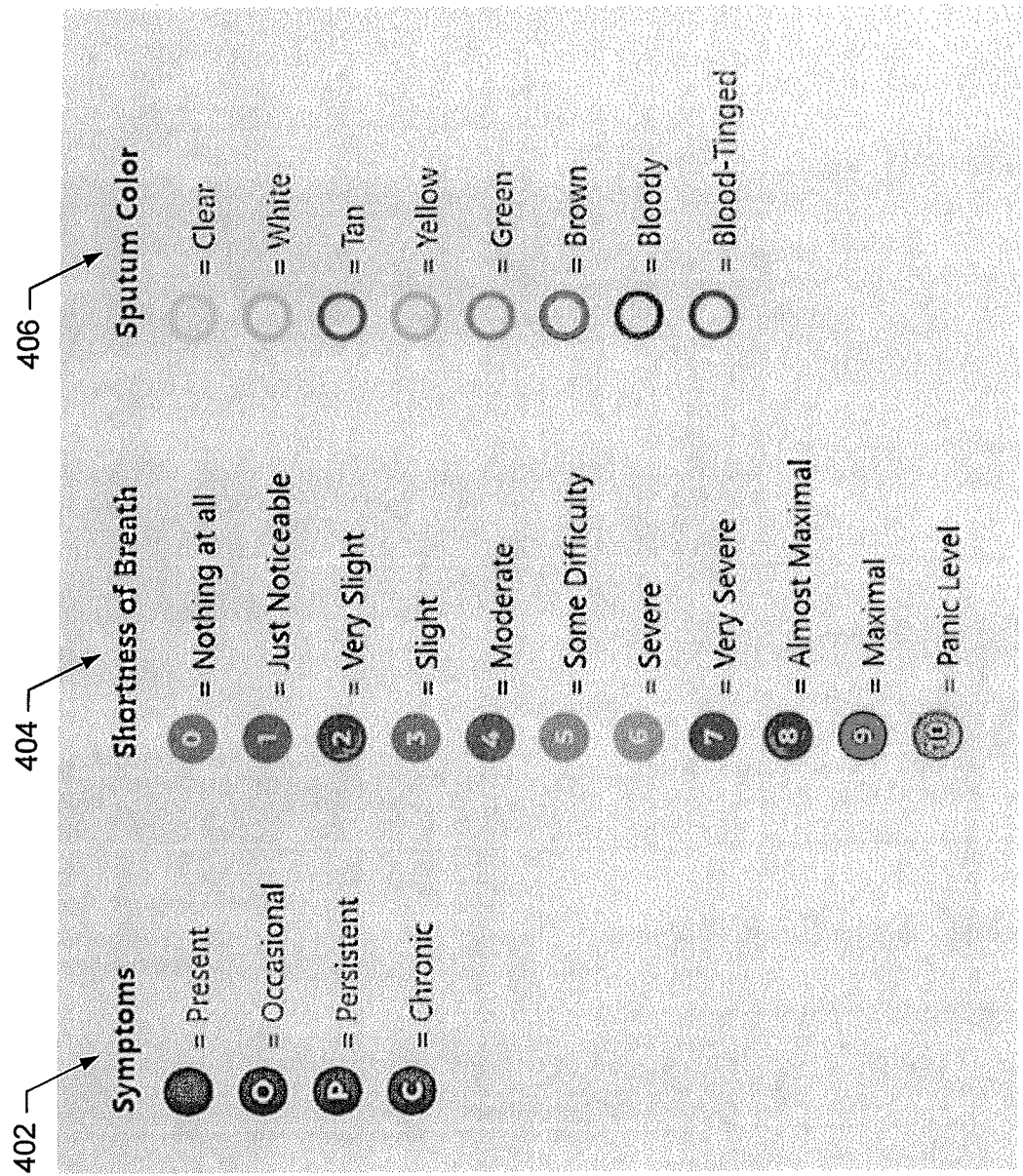

As mentioned earlier, other health information may be included with the spirometry data as provided by a supplemental healthcare device or as patient reported data. In this regard, FIG. 4A shows an example data presentation screen 400 for data entry into the pulmonary health application. In this regard, such data may be entered into a daily calendar interface, where each therapeutic data type may have a respective entry. In this regard, the therapeutic data types that may be entered may include categories for no symptoms, respiration, chest, body, and skin. The data types for respiration may include cough, wheezing, trouble breathing, sputum color. The data types for chest may include shortness of breath (e.g., respiration rate) and chest tightness. The data types for body may include chills, aches, fatigue, loss of taste/smell, and fever. Finally, the data types for skin may include blotchy skin or rash. With reference to FIG. 4B, a legend for selection options for entry of the therapeutic data is shown. In this regard, the legend is separated into symptoms 402, shortness of breath 404, and sputum color 406. Each of the entry options may be associated with an underlying value that may be used, for example, with respect to thresholds and the like for diagnostic purposes. In this regard, for example, each sputum color option may be associated with an underlying numeric value that may be used in comparisons and data processing.

Figure 5:
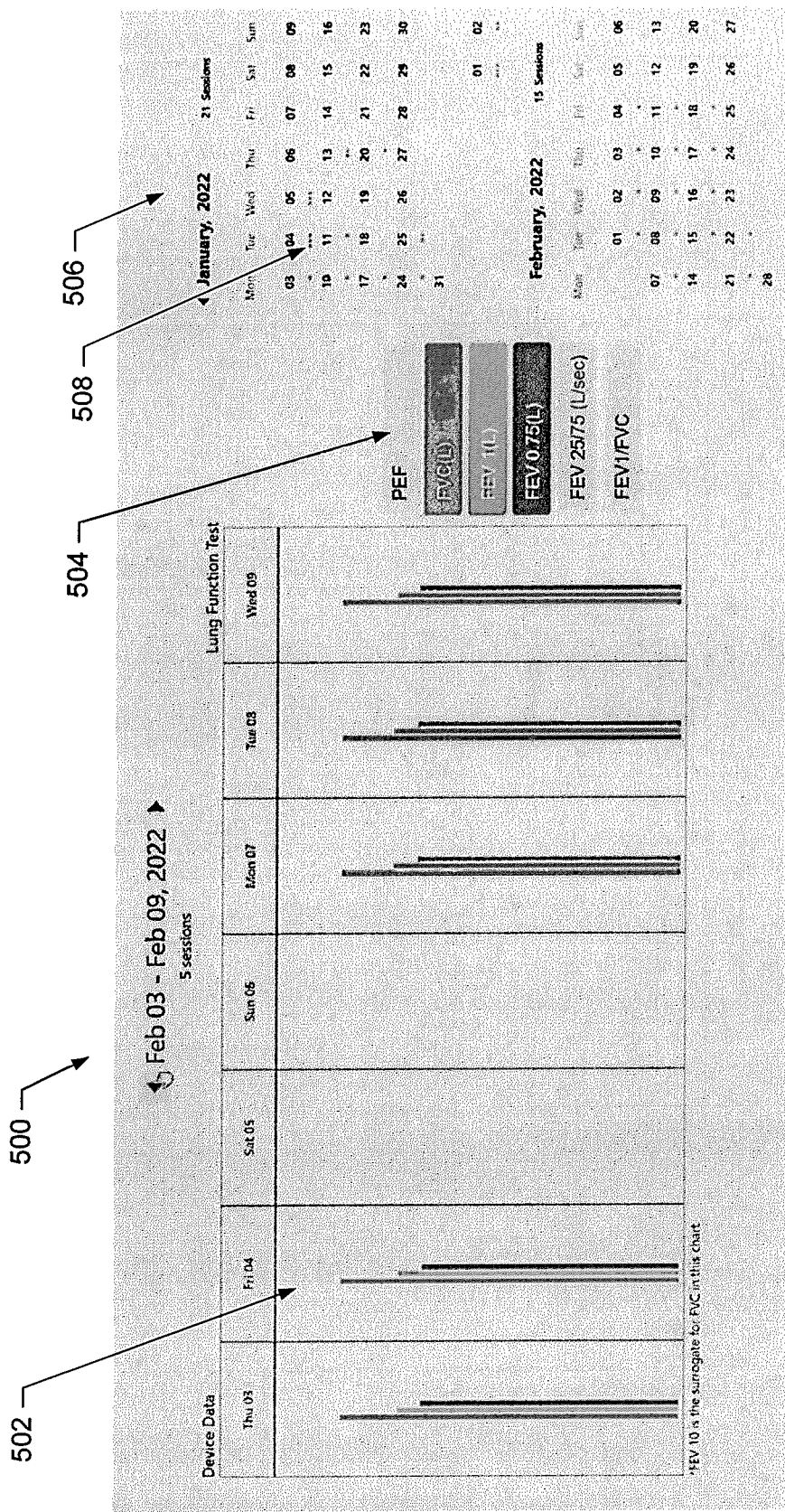
FIG. 5 illustrates an example display screen with various types of spirometry data rendered on the display screen according to some example embodiments.

FIG. 5 is an example display screen 500 for showing spirometry data to a patient via the pulmonary health application on the mobile communications device, or to healthcare personnel via the healthcare-related entity describe above. In this regard, the display screen 500 may be populated with data retrieved from, for example, the serverless spirometry database 134 and displayed. As can be seen, the data may be provided in daily graphs. In this regard, bar graphs 502 may be provided which are indicative of FVC, $FEV_1$, and $FEV_{0.75}$ as provided in the legend 504. The display screen 500 may also provide a small monthly calendar 506 for navigation purposes. Additionally, the monthly calendar 506 may include indicator dots 508 on each day in the monthly calendar that indicate the number of spirometry sessions that were captured on that day.

Figure 6:
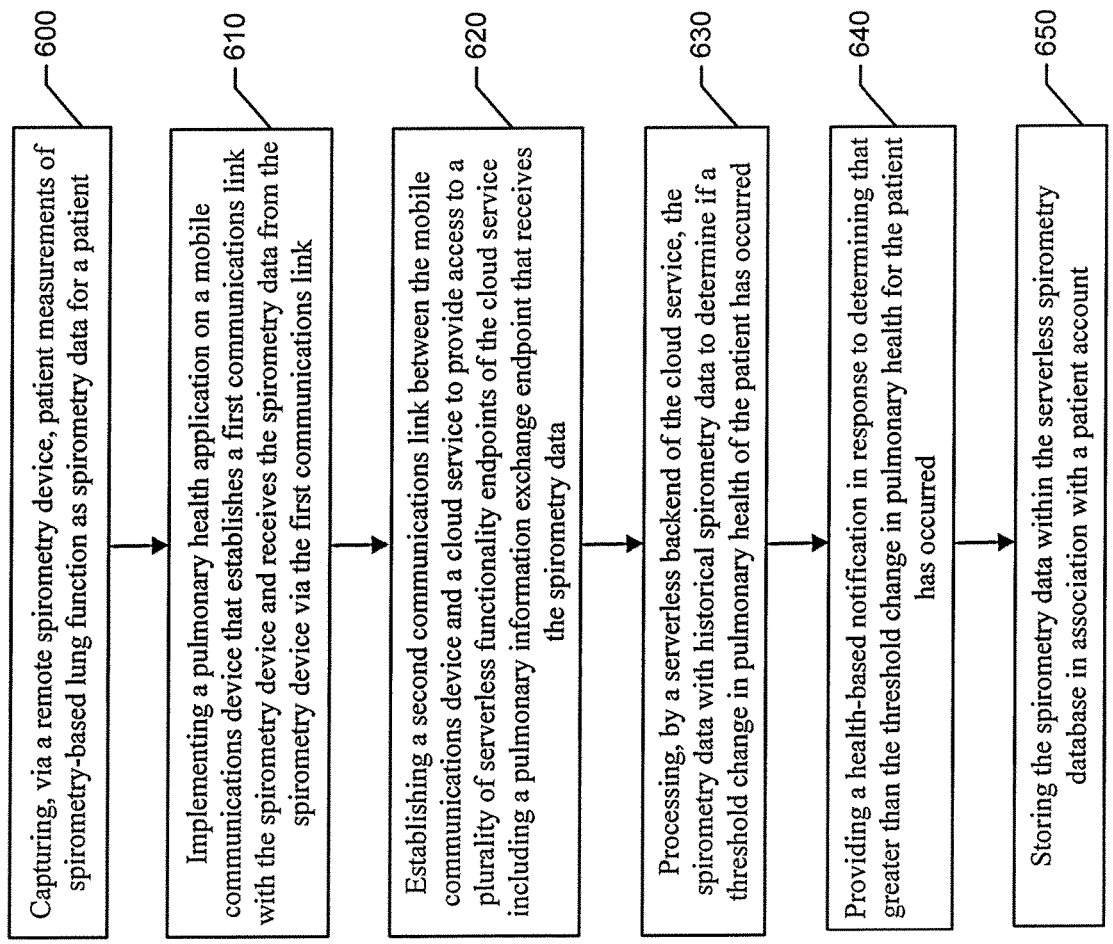
FIG. 6 illustrates a flowchart for healthcare monitoring and diagnostic actions according to some example embodiments.

Now referring to FIG. 6, an example method for healthcare monitoring and diagnostic actions is provided. According to some example embodiments, the example method may comprise capturing, via an remote spirometry device, patient measurements of spirometry-based lung function as spirometry data for a patient at 600. At 610, the example method may comprise implementing a pulmonary health application on a mobile communications device that establishes a first communications link with the spirometry device and receives the spirometry data from the spirometry device via the first communications link. Further, at 620, the example method may comprise establishing a second communications link between the mobile communications device and a cloud service to provide access to a plurality of serverless functionality endpoints of the cloud service including a pulmonary information exchange endpoint that receives the spirometry data. At 630, the example method may comprise processing, by a serverless backend of the cloud service, the spirometry data with historical spirometry data to determine if a threshold change in pulmonary health of the patient has occurred, the historical spirometry data having been previously stored in a serverless spirometry database. At 640, the example method may further comprise providing a health-based notification in response to determining that greater than the threshold change in pulmonary health for the patient has occurred, and, at 650, storing the spirometry data within the serverless spirometry database in association with a patient account.

Additionally, according to some example embodiments, the historical spirometry data may comprise trustworthy spirometry data that was captured while a patient was under supervision of healthcare personnel during measurements associated with the trustworthy spirometry data. In this regard, the method may further comprise validating the spirometry data from the remote spirometry device against the trustworthy spirometry data by determining if the spirometry data from the at-home spirometry device is within a threshold range of the trustworthy spirometry data. Additionally or alternatively, the method may comprise capturing diagnostic patient measurements of spirometry-based lung function, from a diagnostic spirometry device (e.g., diagnostic spirometry device 144), as trustworthy spirometry data for the patient due to, for example, supervision of healthcare personnel during the capture of the diagnostic patient measurements. The method may also comprise receiving, at the serverless backend, the trustworthy spirometry data and storing the trustworthy spirometry with the spirometry data from the remote spirometry device in association with the patient account.

Additionally or alternatively, the example method may comprise receiving, by the mobile communications device implementing the pulmonary health application, therapeutic data including respiration rate data, and providing the therapeutic data to the pulmonary information exchange endpoint. In this regard, processing the spirometry data may comprise processing the spirometry data with the therapeutic data to determine if the threshold change in pulmonary health has occurred. Additionally or alternatively, according to some example embodiments, the threshold change in pulmonary health may be defined by at least a threshold decrease in spirometry-based lung function relative to a stable spirometry-based lung function for the patient over a recent duration of time and at least a threshold increase in respiration rate for the patient over the recent duration of time. Additionally or alternatively, the trustworthy spirometry may be used to determine a stable spirometry-based lung function over a recent duration of time. Additionally, the method may further comprise validating the spirometry data from the remote spirometry device against the stable spirometry-based lung function by determining if the spirometry data from the remote spirometry device is within a threshold range of the stable spirometry-based lung function.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such examples are described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

The invention claimed is:

1. A healthcare monitoring and diagnostic data system comprising:
    a remote patient spirometry device configured to capture patient measurements of spirometry-based lung function as remote patient spirometry data for a patient based on measurements of forced exhales by a patient into the remote patient spirometry device during a remote patient spirometry session without supervision by healthcare personnel, the remote patient spirometry data comprising airflow rate and duration of an exhale of the patient, the remote patient spirometry device being configured to be used by the patient without supervision by healthcare personnel in a patient's home and remote from a healthcare facility;
    a mobile communications device configured to implement a pulmonary health application that establishes a first communications link with the remote patient spirometry device, prompts the user to perform the remote patient spirometry session using the remote patient spirometry device, receives the remote patient spirometry data from the remote patient spirometry device via the first communications link for the remote patient spirometry session, and also receives therapeutic data comprising respiration rate data; and
    a cloud service configured to establish a second communications link with the mobile communications device to provide access to a plurality of serverless functionality endpoints, wherein the plurality of serverless functionality endpoints include a pulmonary information exchange endpoint that receives the remote patient spirometry data and the therapeutic data from the mobile communications device;
    wherein the cloud service further comprises a serverless backend that:
        processes the therapeutic data and processes the remote patient spirometry data based on a relationship with historical spirometry data, the historical spirometry data having been previously stored in a serverless spirometry database and the historical data comprising trustworthy spirometry data, the trustworthy spirometer data being trustworthy because the trustworthy spirometry data that was captured using a spirometry device while the patient was under supervision of healthcare personnel during a spirometry session during capture of the trustworthy spirometry data;

validates the remote patient spirometry data captured by the remote patient spirometry device against the trustworthy spirometry data by determining that the remote patient spirometry data is within a defined validation threshold range of the trustworthy spirometry data;

based on the processed therapeutic data and the processed and validated remote patient spirometry data, determines that a threshold decline in pulmonary health of the patient has occurred;

provides a healthcare notification in response to determining that greater than the threshold decline in pulmonary health for the patient has occurred;

in response to determining that greater than the threshold decline in pulmonary health for the patient has occurred, instruct the mobile communications device to increase a frequency of prompting the user to perform remote patient spirometry sessions using the remote patient spirometry device; and stores the remote patient spirometry data within the serverless spirometry database in association with a patient account.

2. The healthcare monitoring and diagnostic data system of claim 1,
wherein the trustworthy spirometry data includes an indicator stored with the trustworthy spirometry data at the cloud service that differentiates the trustworthy spirometry data from the remote patient spirometry data captured by the remote patient spirometry device.

3. The healthcare monitoring and diagnostic data system of claim 1, further comprising a diagnostic spirometry device; configured to capture diagnostic patient measurements of spirometry-based lung function as the trustworthy spirometry data for the patient due to supervision of healthcare personnel during the capture of the diagnostic patient measurements using the diagnostic spirometry device at a heal facility;
wherein the serverless backend is configured to receive the trustworthy spirometry data and store the trustworthy spirometry with the remote patient spirometry data from the remote patient spirometry device in association with the patient account.

4. The healthcare monitoring and diagnostic data system of claim 1,
wherein the serverless backend further determines if the threshold decline in pulmonary health has occurred based on a threshold change in spirometry-based lung function relative to a stable spirometry-based lung function for the patient over a recent duration of time and at least a threshold change in respiration rate for the patient over the recent duration of time.

5. The healthcare monitoring and diagnostic data system of claim 1, wherein the therapeutic data comprises sputum characteristics comprising sputum color;
wherein the threshold decline in pulmonary health is defined by at least a threshold decline in spirometry-based lung function relative to a stable spirometry-based lung function for the patient over a recent duration of time and a change in sputum characteristics over the recent duration of time.

6. The healthcare monitoring and diagnostic data system of claim 1, wherein the serverless backend processes the spirometry data to determine $FEV_x$ data;
wherein the threshold decline in pulmonary health is defined by at least a threshold decrease in $FEV_x$ data relative to stable $FEV_x$ data for of the patient over a recent duration of time and at least a threshold change in respiration rate for the patient over the recent duration of time.

7. The healthcare monitoring and diagnostic data system of claim 1, wherein the serverless backend provides the healthcare notification to the mobile communications device and a healthcare provider.

8. The healthcare monitoring and diagnostic data system of claim 1, wherein the plurality of serverless functionality endpoints for the cloud service comprises a serverless identity service provider;
wherein the pulmonary health application authenticates an identity of the patient with the serverless identity service provider.

9. The healthcare monitoring and diagnostic data system of claim 1, wherein serverless backend stores the remote patient spirometry data within the serverless spirometry database in association with the patient account using an account identifier, wherein the account identifier and the serverless spirometry database do not include personally identifiable information about the patient;
wherein the serverless identity service provider uses the account identifier to map data within the serverless spirometry database with the personally identifiable information about the patient held by the serverless identity service provider.

10. The healthcare monitoring and diagnostic data system of claim 1, wherein the plurality of serverless functionality endpoints comprises a serverless identity service provider;
wherein the serverless backend establishes a third communication connection with a healthcare provider portal in response to a healthcare provider performing an identity authentication with the serverless identity service provider;
wherein the serverless backend provides the healthcare provider portal with access to data of the serverless spirometry database based on the identity authentication.

11. The healthcare monitoring and diagnostic data system of claim 1, wherein the mobile communications device is further configured to establish a third communication connection with a supplemental healthcare device configured to capture additional healthcare measurements of the patient for provision to the pulmonary health application and storage in the serverless spirometry database in association with the patient account;
wherein the supplemental healthcare device is one of a heart rate monitor, a weight scale, a thermometer, a pulse oximeter, a continuous positive airway pressure device, bi-level positive pressure device, or a non-invasive ventilation device.

12. The healthcare monitoring and diagnostic data system of claim 1, wherein pulmonary health application erases the remote patient spirometry data from the mobile communications device upon successful provision of the remote patient spirometry data to the serverless backend.

13. The healthcare monitoring and diagnostic data system of claim 1, wherein the serverless spirometry database is a component of a shared electronic medical record for the patient.

14. The healthcare monitoring and diagnostic data system of claim 1, wherein the serverless backend processes the spirometry data to determine $FEV_x$ data;
  wherein the therapeutic data comprises sputum characteristics comprising sputum color;
  wherein spirometry data and the therapeutic data are processed to be normalized and combined to determine a measure of pulmonary health for determining if the threshold decline in pulmonary health has occurred.

15. The healthcare monitoring and diagnostic data system of claim 1, wherein the threshold decline in pulmonary heath is one of a plurality of change thresholds, wherein the processed therapeutic and remote patient spirometry data is evaluated against each of the change thresholds of the plurality of change thresholds to determine if a respective healthcare notification should be provided to the patient by the mobile communications device.

16. A method for healthcare monitoring comprising:
  capturing, via an remote patient spirometry device, patient measurements of spirometry-based lung function as remote patient spirometry data for a patient based on measurements of forced exhales by the patient in to the remote patient spirometry device during a remote patient spirometry session without supervision by healthcare personnel, the remote patient spirometry data comprising airflow rate and duration of an exhale of the patient, the remote patient spirometry device being configured to be used by the patient without supervision by healthcare personnel in a patient's home and remote from a healthcare facility;
  implementing a pulmonary health application on a mobile communications device that establishes a first communications link with the remote patient spirometry device, prompts the user to perform the remote patient spirometry session using the remote patient spirometry device, receives the remote patient spirometry data from the remote patient spirometry device via the first communications link for the remote patient spirometry session, and also receives therapeutic data comprising respiration rate data;
  establishing a second communications link between the mobile communications device and a cloud service to provide access to a plurality of serverless functionality endpoints of the cloud service including a pulmonary information exchange endpoint that receives the remote patient spirometry and the therapeutic data from the mobile communications device;
  processing, by a serverless backend of the cloud service, the therapeutic data and processing the remote patient spirometry data based on a relationship with historical spirometry data, the historical spirometry data having been previously stored in a serverless spirometry database and the historical data comprising trustworthy spirometry data, the trustworthy spirometry data being trustworthy because the trustworthy spirometry data that was captured using a spirometry device while the patient was under supervision of healthcare personnel during a spirometry session during capture of the trustworthy spirometry data;
  validating the remote patient spirometry data captured by the remote patient spirometry device against the trustworthy spirometry data by determining that the remote patient spirometry data is withing a defined validation threshold range of the trustworthy spirometry data,
  based on the processed therapeutic data and the processed and validated remote patient spirometry data, determining that a threshold decline in the pulmonary health of the patient has occurred;
  providing a health-based notification in response to determining that greater than the threshold decline in pulmonary health for the patient has occurred;
  in response to determining that greater than the threshold decline in pulmonary health for the patient has occurred, instructing the mobile communications device to increase a frequency of prompting the user to perform remote patient spirometry sessions using the remote patient spirometry device; and
  storing the remote patient spirometry data within the serverless spirometry database in association with a patient account.

17. The method of claim 16 further comprising using the trustworthy spirometry data to determine a stable spirometry-based lung function over a recent duration of time.

18. The method of claim 16 further comprising:
  capturing diagnostic patient measurements of spirometry-based lung function from a diagnostic spirometry device as the trustworthy spirometry data for the patient due to supervision of healthcare personnel during the capture of the diagnostic patient measurements sing the diagnostic spirometry device at a healthcare facility; and
  receiving, at the serverless backend, the trustworthy spirometry data and storing the trustworthy spirometry with the remote patient spirometry data from the remote patient spirometry device in association with the patient account.

19. The method of claim 16, wherein the decline change in pulmonary health is defined by at least a threshold decline in spirometry-based lung function relative to a stable spirometry-based lung function for of the patient over a recent duration of time and at least a threshold decline in respiration rate for the patient over the recent duration of time.

* * * * *

UNITED STATES PATENT AND TRADEMARK OFFICE
CERTIFICATE OF CORRECTION

| | | |
|---|---|---|
| PATENT NO. | : 12,512,218 B2 | Page 1 of 1 |
| APPLICATION NO. | : 17/694072 | |
| DATED | : December 30, 2025 | |
| INVENTOR(S) | : Clark et al. | |

It is certified that error appears in the above-identified patent and that said Letters Patent is hereby corrected as shown below:

In the Claims

In Column 19, Claim 1, Line 2, "spirometer data" should read --spirometry data--

In Column 19, Claim 3, Line 44, "heal facility;" should read --healthcare facility;--

In Column 22, Claim 16, Line 10, "data is withing" should read --data is within--

In Column 22, Claim 18, Line 37, "measurements sing" should read --measurements using--

Signed and Sealed this
Tenth Day of February, 2026

John A. Squires
*Director of the United States Patent and Trademark Office*